Patented May 11, 1943

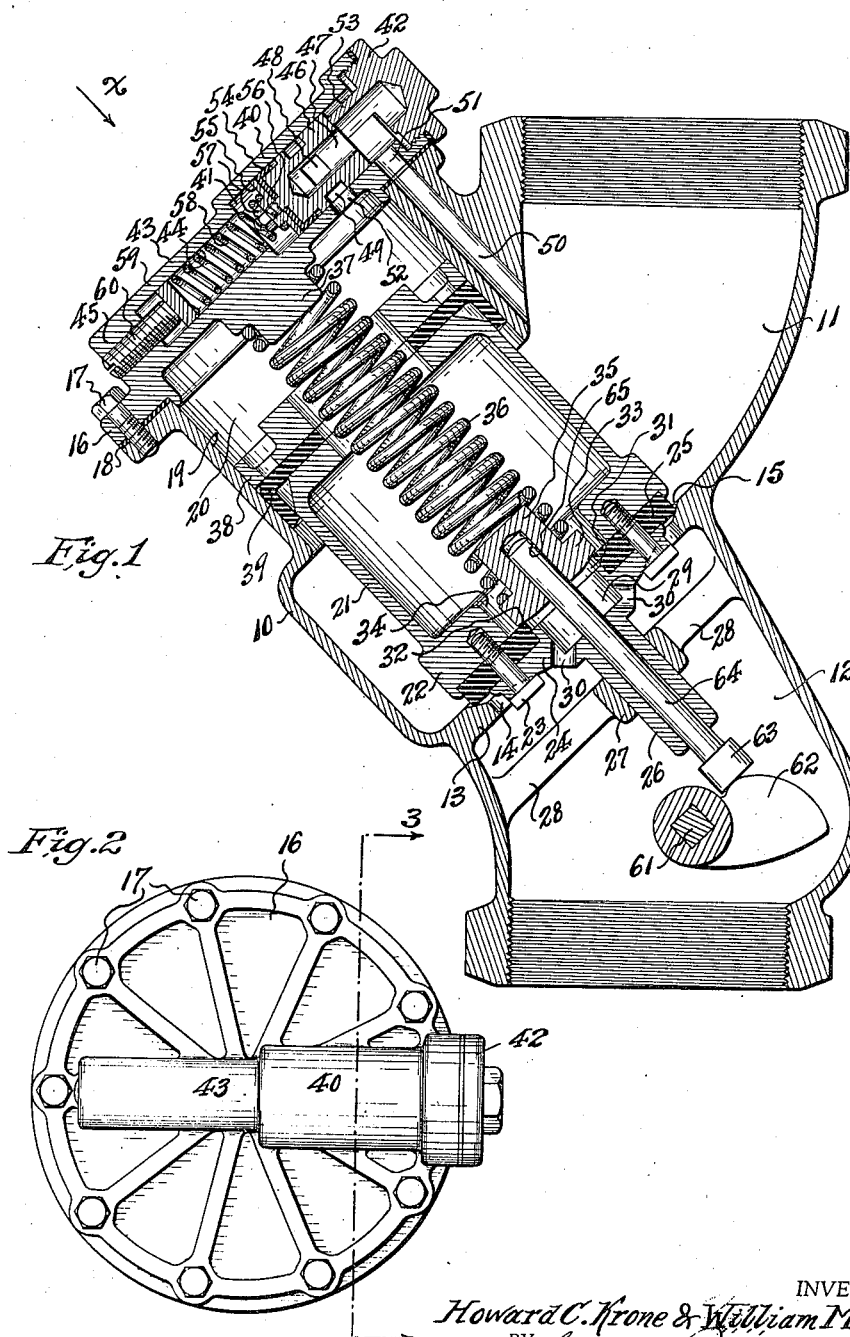

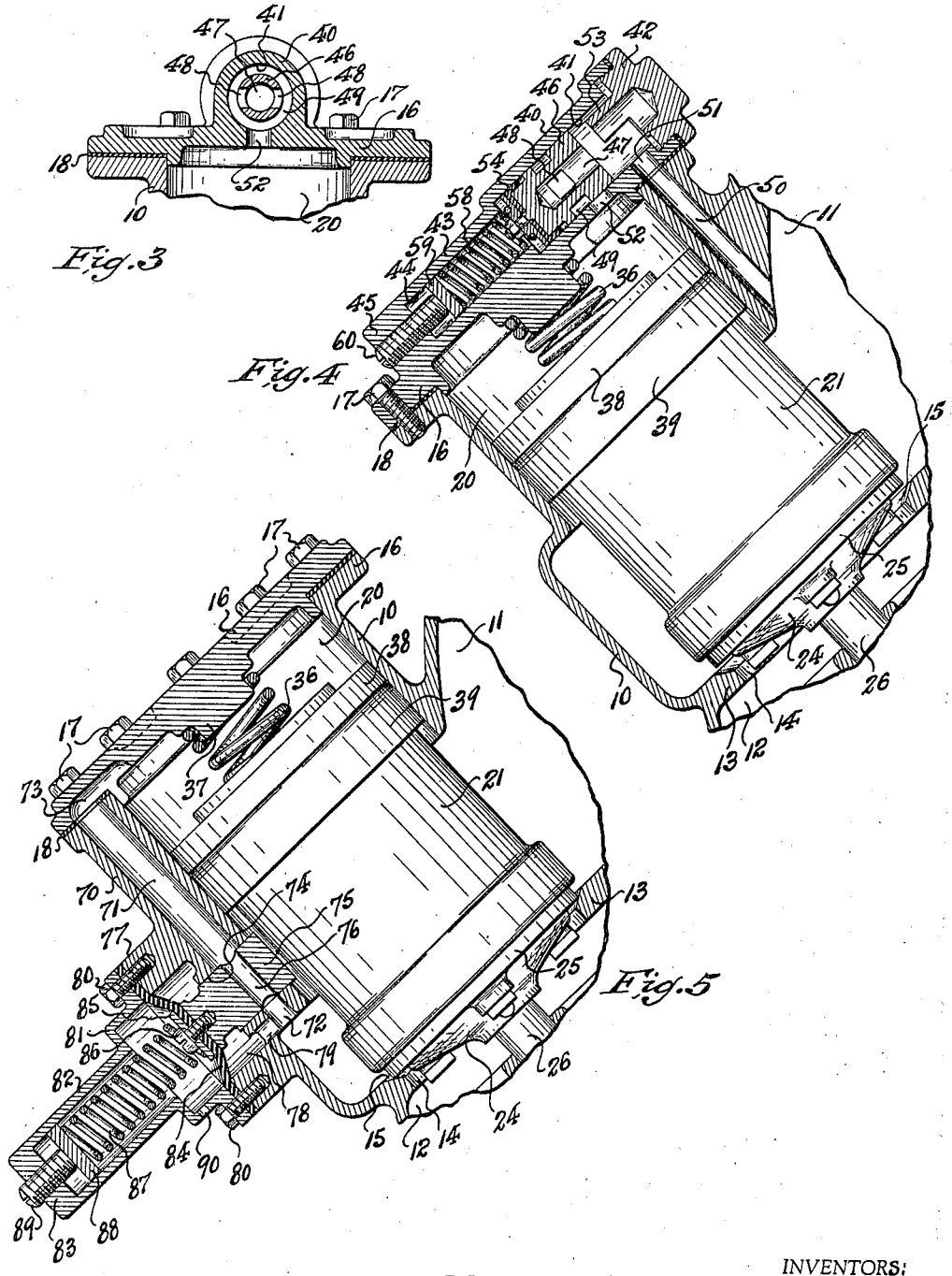

2,319,069

UNITED STATES PATENT OFFICE 2,319,069

SELF-CLOSING VALVE

Howard C. Krone, River Edge, and William Meyer, East Orange, N. J., assignors to Wheaton Brass Works, Newark, N. J., a corporation of New Jersey Application August 29, 1942, Serial No. 456,622

6 Claims. (Cl. 137—139)

This invention relates to improvements in self-closing valves; and the invention has reference, more particularly, to a novel construction of self-closing valve provided with means for checking or slowing down the closing movement of the valve to prevent sudden excess back pressure and resultant fluid-hammer in the fluid delivery line through which fluid is served to and for discharge through the valve.

The invention has for an object to provide, in combination with a self-closing valve, novel means for checking or retarding the closing movement of the valve, such checking means being so constructed and arranged that it offers little or no impedance to valve closing movement under negative or low back pressure conditions, but which functions, however, to exert its checking or retarding effect upon valve closing movement under high or excessive back pressure conditions, and to increase such checking or retarding effect proportionately to the rise of such back pressure; all whereby, under substantially normal or low back pressure conditions, rapid valve closing movement is permitted, especially during initial phases of such movement, but under suddenly mounting or excessive back pressure conditions, occurring as the valve approaches its seat, exerts increasing resistance to closing movement, so as to effect reduction or relief of such back pressure.

Another object of this invention is to provide, in combination with a self-closing valve, novel means for checking or retarding the closing movement of the valve which is adjustable or regulatable so as to be responsive only to back pressure above a desired predetermined minimum limit and proportionally responsive to a range of back pressure between said minimum limit and a given maximum limit for which the valve may be designed.

Other objects of this invention, not at this time more particularly enumerated, will be understood from the following detailed description of the same.

Illustrative embodiments of the invention are shown in accompanying drawings, in which:

Fig. 1 is a vertical longitudinal sectional view of a self-closing valve equipped with one form of checking means according to this invention, the valve being shown in closed condition and said checking means in normal initial condition; Fig. 2 is a plan view of the top end of the valve casing, viewed in the direction of the arrow X in Fig. 1; Fig. 3 is a fragmentary transverse sectional view through the checking means, taken on line 3—3 in Fig. 2; and Fig. 4 is a fragmentary vertical longitudinal sectional view of the valve, showing the valve member approaching its seat during a closing movement thereof and the checking means as operative to check or retard said closing movement, the valve member being shown in side elevation.

Fig. 5 is a fragmentary vertical longitudinal sectional view of a self-closing valve equipped with a modified form of checking means according to this invention, the valve being shown in side elevation and in closed condition, and the checking means in normal initial condition.

Similar characters of reference are employed in the above described views to indicate corresponding parts.

Referring to the drawings, the reference character 10 indicates the main body of the valve casing which is of cylindrical form. Springing from a side of said main body is an intake extension 11, and extending from the lower end of said main body is an outlet extension 12. The main body 10 is provided at its lower end with a transverse partition portion 13 disposed intermediate the intake extension 11 and outlet extension 12. Said partition is provided with a valve port opening 14 which is aligned with the longitudinal axis of said main body 10. Formed on the upper margin of said valve port opening 14 is a chamfered valve seat 15.

At its upper end, said main body 10 is closed by a top head or cap 16 which is secured thereto by cap-screws 17, or in any other suitable manner, the joint therebetween being rendered leakproof by an interposed sealing gasket 18.

Formed in the upper end of said main body 10 is a cylindrical bore 19 which defines a cylinder chamber 20. Mounted for reciprocation in said main body 10 is a hollow plunger 21 having a bottom wall 22. Affixed to said bottom wall 22, by cap screws 23 or other suitable fastening means, is a bottom cap 24 of reduced diameter, and disposed between said bottom cap 24 and plunger bottom wall 22 is a valve disc 25. Said valve disc is made of a suitable material, and is adapted to engage with the valve seat 15 to close the valve port or opening 14. Extending downwardly from said bottom cap 24, in axial alignment with the plunger 21, is a tubular stem 26, which preferably forms an integral part of said bottom cap 24. Said stem 26 is slidably guided in a bearing support 27, which is carried by spider arms 28 extending between the same and the walls of the outlet 12. Centrally formed within the bottom cap 24 is an upwardly open outlet chamber 29 having bottom discharge openings 30 communicating with the interior of the outlet extension 12. The valve disc 25 is provided with a central opening 31 aligned in communication with the upwardly open end of said outlet chamber 29, the upper margins 32 of said valve disc providing a seat with which cooperates a cylinder chamber discharge valve 33. The plunger bottom wall 22 is provided with a central opening 34, which exceeds in diameter the diameter of said valve disc opening 31 and that of said cylinder chamber discharge valve 33 which extends therethrough. Said discharge valve 33 is provided with an upwardly extending seating boss 35 of reduced diameter. Said discharge valve 33 and, through it, the plunger 21 and valve disc 25 carried thereby are yieldably thrust to closed positions by closing spring 36, the lower end of which is engaged around said seating boss 35 of the discharge valve 33, and the upper end of which is footed for thrust by engagement around a seating boss 37 which depends from the inner or underside of said top head or cap 16. Affixed to the upper end of the plunger 21 is a piston member 38 adapted to slidingly engage the bore 19 of the cylinder chamber 20, and affixed between said piston member 38 and the plunger is a piston washer or packing cup 39 of comparatively flexible material, the skirt of which slidingly hugs the bore 19 of said cylinder chamber 20, thus functioning as a sealing ring between the plunger-piston structure and the cylinder chamber walls.

One form of novel checking or retarding means, according to this invention, by which closing movement of the valve is controlled, and as illustrated in Figs. 1 to 4 inclusive, comprises a back pressure responsive valve mechanism which communicates with the upper end of the cylinder chamber 20. This valve mechanism includes a valve housing 40, preferably formed as an integral part of the top head or cap 16, whereby to form a valve chamber 41 having an outwardly open end which is closed by a cylinder head 42 suitably secured to said housing 40, as e. g. by being threaded into said open end thereof. At its inner end, the housing 40 is provided with an axial extension 43, preferably of reduced diameter, the same having an axial bore 44 communicating with the inner end of said valve chamber 41. An end wall 45 of said extension 43 closes the outer end of its bore 44.

Slidably movable in the valve chamber 41 is a back pressure valve 46. This valve 46 has an axial intake chamber 47 entering therein through its outer or rearward end, and one or more radial passages 48 leading therefrom into communication with an external annular outlet channel 49 with which the valve body is provided.

Formed in connection with the body 10 of the main valve casing, to extend through the wall thereof, is a by-pass duct 50, the lower intake end of which communicates with the interior of the intake extension 11, and the discharge end of which registers with a port 51 provided in the top head or cap 16, through which said by-pass duct communicates with the back pressure valve chamber 41 behind the back pressure responsive valve 46. Also formed in said top head or cap 16 is a port 52 with which the outlet channel 49 of the back pressure valve 46 normally registers, and which leads from the latter into the cylinder chamber 20. Said back pressure valve 46 is stopped, in a position establishing its aforesaid normal communication with the cylinder chamber 20 through said port 52, by abutment against a hollow stop projection 53 with which the inner side of the cylinder head 42 is provided.

Affixed to the forward or inner end of the back pressure valve 46 is a piston cup 54, the skirt of which slidingly hugs and seals against the walls of said valve chamber 41. Said piston cup is retained in place by a keeper washer 55 which is mounted on a screw-threaded axial stud 56 projecting from the inner end of said back pressure valve, and being secured thereto by a nut 57 which is screwed onto said stud. Said back pressure valve 46 is yieldably thrust to its above described stopped normal position by a compression spring 58, which is housed within the bore 44 of the axial extension 43 with which the valve housing 40 is provided. Said spring 58 is footed upon a thrust piece 59 slidably movable in the extension bore 44. Threaded through the end wall 45 of said extension 43 is an adjusting screw 60, the inner end of which bears upon and supports said thrust piece 59. The adjusting screw 60 is utilized to increase or decrease the tension of the spring 58, whereby to predetermine a minimum pressure which must be exceeded before the back pressure valve will respond or operate.

Means are provided for opening the main valve by manual operation. This means comprises a spindle 61 journaled to extend transversely through the outlet extension 12, one end of said spindle extending through a stuffing-box (not shown) as is customary with lever or wrench actuatable valves. Fixed on said spindle, so as to turn therewith, is a lift-cam 62. Said lift-cam cooperates with the enlarged head 63 of a push-piece 64. Said push-piece extends slidingly through the stem 26 to engage in a socket 65 provided for its reception in the cylinder chamber discharge valve 33.

When the lift-cam 62 is rotated in a proper direction, it exerts an upward thrust upon the push-piece 64, whereby the same is separately moved until its head 63 abuts the end of the main valve stem 26. This initial separate movement of the push-piece 64 first opens the cylinder chamber discharge valve 33 and thereafter moves upward the plunger 21 so as to raise the valve disc 25 from the seat 15, and thus open the port 14 to the flow of fluid from the intake extension 11 outwardly through the outlet extension 12. Since the cylinder chamber discharge valve 33 is open during such rising of the main valve, any fluid in the cylinder chamber 20 and hollow plunger 21 escapes readily and quickly through the chamber 29 and discharge openings 30, and consequently resistance to opening movement of the main valve is reduced to a minimum so that the same may be quickly and easily moved to open position.

When the main valve is opened by manual actuation of the lift-cam 62, the spring 36 is compressed, and the valve remains open to flow of fluid therethrough so long as the lift-cam is held in lifting position. When the lift-cam is released, the compressed spring 36 immediately reacts to first move the cylinder chamber discharge valve to closed position, and thereafter to move the main valve toward its seat so as to close the port 14. As the piston and plunger of the main valve begins downward movement in the cylinder chamber 20, the back pressure valve 46 occupies its normal retracted and stopped position whereby its fluid passages 47—48—49 are in full communication with the port 52, and consequently fluid from the supply pipe line entering the intake extension 11 flows freely through the by-pass duct 50, port 51, back pressure valve passages 47—48—49, and port 52 into the cylinder chamber 20 behind the piston plunger of the main valve, and consequently the initial downward movement of the latter is unimpeded and rapid (see Fig. 1). As the main valve disc 25 approaches its seat 15 and closed relation to the valve port opening 14, back pressure in the supply pipe line, due to inertia of the fluid therein, tends to rise. If such back pressure rises beyond a minimum for which the back pressure valve 46 is adjusted by regulation of its control spring 58, such rising back pressure reacts upon the back pressure valve 46 so as to move the same inward against the tension of said spring 58. Such inward movement of the back pressure valve carries its outlet channel 49 out of alignment with the port 52, tending to close the latter, whereby flow of fluid therethrough is retarded or even arrested, so that fluid pressure on opposite sides of the piston-plunger becomes unbalanced, and consequently pressure resistance to downward movement of the piston-plunger is increased so as to retard the closing movement of the valve disc 25 toward its seat (see Fig. 4). This retardation of closing movement of the main valve gives time for the inertia of the fluid in the supply pipe line to be overcome and the resulting back pressure relieved without producing hammer in the supply line. As the back pressure in the supply line diminishes, the control spring 58 will gradually return the back pressure valve to normal initial position, and thus admit fluid to the cylinder chamber o as to restore balance of fluid pressure on opposite sides of the piston-plunger, and consequently permitting the main valve to slowly approach and finally settle upon its seat in valve port closing position, and by so doing thus eliminate excessive hammer or shock to and within the supply line.

Since the back pressure valve 46 may be regulated and nicely adjusted for response only to back pressures in excess of a predetermined minimum, unharmful back pressure below such minimum will not operate the back pressure valve 46, so that under such conditions rapid closing of the main valve is unimpeded, and retardation of main valve closing movement occurs only upon rise of and in proportion to excessive back pressure. It will therefore be obvious that a quick closing action of the valve is assured, while nevertheless provision is made for prevention of shock should excessive back pressure arise.

Referring to Fig. 5 of the drawings, there is shown therein a somewhat modified form and arrangement of back pressure valve means, which embodies however the principles of the instant invention, the same comprising a longitudinally extending by-pass member 70 formed in connection with a side of the main body 10 to provide a by-pass duct 71, the lower intake end 72 of which communicates with the interior of the valve casing on the intake side of its valve port opening 14, and the upper end of which communicates through a branch passage 73, formed in the top head or cap 16, with the upper end of the cylinder chamber 20. Intersecting said by-pass member 70 and its by-pass duct 71 is a transverse slideway 74 in which a back pressure valve body 75 is slidably disposed for movement across said by-pass duct 71. Said back pressure valve 75 is provided with a port 76 which is normally aligned with said by-pass duct 71. Exteriorly projecting from the main body 10 in axial alignment with said back pressure valve 75 is an outwardly open housing 77 of enlarged diameter, the interior of which provides a pressure chamber 78 having communication through an opening 79 with the interior of the main valve casing on the intake side of its valve port opening 14. Secured, by cap screws 80, to and across the outer open end of said housing 77 is a closure cap 81. Said closure cap 81 is provided with an axial extension 82 of reduced diameter which is closed at its outer extremity by an end wall 83. Secured to and between said housing 77 and closure cap 81 is a flexible diaphragm 84, arranged to extend across the outer end of the pressure chamber 78. The outer end of the back pressure valve 75 is affixed to said diaphragm 84 by a washer 85 and cap screw 86. The diaphragm and back pressure valve is yieldably thrust by a compression spring 87 to a position wherein the port 76 of the latter is aligned with the by-pass duct 71, so as to permit free and unobstructed flow of fluid therethrough. Said spring 87 is footed upon a thrust piece 88 slidably movable in the extension 82 of the housing closure cap 81. Threaded through the end wall 83 of said extension 82 is an adjusting screw 89, manipulatable to increase or decrease the tension of said spring 87, whereby to predetermine a minimum pressure which must be exceeded before the back pressure valve 75 will respond or operate. The closure cap 81 is provided with a vent 90 to balance pressure on the outer side of the diaphragm 84 with that of the outside atmosphere.

In the operation of the above described modified form of main valve checking or retarding means, after the main valve has been opened and released for closing, fluid flows freely through the port 76 as normally aligned with the by-pass duct 71—72—73 into the cylinder chamber 20 behind the piston-plunger of the main valve, and consequently the initial downward movement of the latter is unimpeded and rapid. As the main valve approaches its seat 15 and closed relation to the valve port opening 14, back pressure in the supply pipe line, due to inertia of the fluid therein, tends to rise. If such back pressure rises beyond a minimum for which the back pressure valve 75 is adjusted by regulation of its control spring 87, such rising back pressure reacts upon the diaphragm 84 so as to flex the same outwardly against the tension of the spring 87. Such movement of the diaphragm slides the back pressure valve 75 outwardly so as to move its port 76 out of alignment with the intake end 72 of the by-pass duct 71, thus tending to close the latter, whereby flow of fluid therethrough is retarded or even arrested, so that fluid pressure on opposite sides of the piston-plunger 38—39 becomes unbalanced, and consequently pressure resistance to downward movement thereof is increased so as to retard the closing of said main valve, until inertia of the fluid content of the supply line is overcome and resulting back pressure relieved without producing shock or hammer in the supply line. The back pressure valve therefore so controls the closing movement of the main valve, that the latter is caused to slowly approach and settle upon its seat in valve port closing position. By adjusting the tension of the control spring 87, the back pressure valve 75 and its actuating diaphragm, may be regulated for response to back pressure in excess of a desired predetermined minimum, and consequently rapid closing of the main valve is assured unless excessive back pressure in the supply line occurs.

It will thus be obvious that the aforesaid modified form of back pressure valve means functions in substantially the same manner and with the same desirable effects as already above attributed to the first described form of back pressure valve means.

We are aware that many changes could be made in the constructions above described, and that many apparently widely different embodiments of this invention could be made without departing from the scope of this invention as defined in the herefollowing claims. It is therefore intended that all matter contained in the above description or shown in the accompanying drawings shall be interpreted as illustrative and not in a limiting sense.

We claim:

1. A self-closing valve comprising a casing having intake and outlet extensions and a valve port therebetween, a cylinder chamber provided in connection with said casing in axial alignment with and above said valve port, a plunger carrying a main valve means adapted to close said valve port and a piston means movable in said cylinder chamber, spring means to yieldably thrust said plunger in direction to close said valve port by said main valve means, manipulatable means to raise said plunger for opening said main valve means, means to provide communication between the intake side of the valve casing interior and said cylinder chamber, and a normally open spring tensioned back pressure valve means adapted to close said communication means.

2. A self-closing valve comprising a casing having intake and outlet extensions and a valve port therebetween, a cylinder chamber provided in connection with said casing in axial alignment with and above said valve port, a plunger carrying a main valve means adapted to close said valve port and a piston means movable in said cylinder chamber, spring means to yieldably thrust said plunger in direction to close said valve port by said main valve means, manipulatable means to raise said plunger for opening said main valve means, means to provide communication between the intake side of the valve casing interior and said cylinder chamber, a back pressure valve means adapted to open and close said communication means, compression spring means adapted to yieldably hold said back pressure valve means in position to open said communication means, and means to adjust the tension of said spring, whereby to regulate said back pressure valve for response to back pressures in excess of a predetermined minimum.

3. A self-closing valve comprising a main valve casing having intake and outlet extensions and a valve port therebetween, a cylinder chamber axially aligned with and extending above said valve port, a top head to close the outer end of said cylinder chamber, a plunger carrying a main valve means adapted to close said valve port and a piston means movable in said cylinder chamber, spring means to yieldably thrust said plunger in direction to close said valve port by said main valve means, manipulatable means to raise said plunger for opening said main valve means, a back pressure valve means, said top head having a housing within which said back pressure valve means is movably arranged, said top head having a port communicating with the interior of said cylinder chamber, said back pressure valve means having passages to communicate with said port when said valve means is disposed in normal initial position, means to determine normal initial position of said back pressure valve means, means to provide communication between the intake side of the main valve casing interior and said back pressure valve housing and the valve therein, and means to yieldably bias said back pressure valve means to normal initial position.

4. A self-closing valve comprising a main valve casing having intake and outlet extensions and a valve port therebetween, a cylinder chamber axially aligned with and extending above said valve port, a top head to close the outer end of said cylinder chamber, a plunger carrying a main valve means adapted to close said valve port and a piston means movable in said cylinder chamber, spring means to yieldably thrust said plunger in direction to close said valve port by said main valve means, manipulatable means to raise said plunger for opening said main valve means, a back pressure valve means, said top head having a housing within which said back pressure valve means is movably arranged, said top head having a port communicating with the interior of said cylinder chamber, said back pressure valve means having passages to communicate with said port when said valve means is disposed in normal initial position, means to determine normal initial position of said back pressure valve means, means to provide communication between the intake side of the main valve casing interior and said back pressure valve housing and the valve therein, compression spring means adapted to yieldably hold said back pressure valve in normal initial position, and means to adjust the tension of said spring, whereby to regulate said back pressure valve for response to back pressure in excess of a predetermined minimum.

5. A self-closing valve comprising a main valve casing having intake and outlet extensions and a valve port therebetween, a cylinder chamber axially aligned with and extending above said valve port, a top head to close the outer end of said cylinder chamber, a plunger carrying a main valve means adapted to close said valve port and a piston means movable in said cylinder chamber, spring means to yieldably thrust said plunger in direction to close said valve port by said main valve means, manipulatable means to raise said plunger for opening said main valve means, means to provide communication between the intake side of said main valve casing interior and said cylinder chamber, a back pressure valve adapted to open and close said communication means, a pressure responsive diaphragm to which said back pressure valve is connected and by which it is actuated, means to communicate back pressure within the intake side of the main valve casing to said diaphragm, and means to bias said diaphragm to normally hold said back pressure valve in open position.

6. A self-closing valve comprising a main valve casing having intake and outlet extensions and a valve port therebetween, a cylinder chamber axially aligned with and extending above said valve port, a top head to close the outer end of said cylinder chamber, a plunger carrying a main valve means adapted to close said valve port and a piston means movable in said cylinder chamber, spring means to yieldably thrust said plunger in direction to close said valve port by said main valve means, manipulatable means to raise said plunger for opening said main valve means, means to provide communication between the intake side of said main valve casing interior and said cylinder chamber, a back pressure valve adapted to open and close said communication means, a pressure responsive diaphragm to which said back pressure valve is connected and by which it is actuated, means to communicate back pressure within the intake side of the main valve casing to said diaphragm, compression spring means to bias said diaphragm to normally hold said back pressure valve in open position, and means to adjust the tension of said spring, whereby to regulate said diaphragm for response to back pressure in excess of a predetermined minimum.

HOWARD C. KRONE.
WILLIAM MEYER.